United States Patent
Nguyen et al.

(10) Patent No.: US 10,030,493 B2
(45) Date of Patent: Jul. 24, 2018

(54) METHODS AND COMPOSITIONS FOR SUPPRESSING BACTERIAL GROWTH IN A SUBTERRANEAN ENVIRONMENT

(71) Applicant: Halliburton Energy Services, Inc., Houston, TX (US)

(72) Inventors: Philip D. Nguyen, Houston, TX (US); Prashant D. Chopade, Kingwood, TX (US); David Loveless, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/315,010

(22) PCT Filed: Sep. 24, 2014

(86) PCT No.: PCT/US2014/057098
§ 371 (c)(1),
(2) Date: Nov. 30, 2016

(87) PCT Pub. No.: WO2016/048291
PCT Pub. Date: Mar. 31, 2016

(65) Prior Publication Data
US 2017/0191357 A1    Jul. 6, 2017

(51) Int. Cl.
*E21B 43/247* (2006.01)
*C09K 8/60* (2006.01)
*C09K 8/80* (2006.01)

(52) U.S. Cl.
CPC ............ *E21B 43/247* (2013.01); *C09K 8/605* (2013.01); *C09K 8/805* (2013.01); *C09K 2208/10* (2013.01)

(58) Field of Classification Search
CPC ....... E21B 43/247; C09K 8/605; C09K 8/805; C09K 2208/10
(Continued)

(56) References Cited

U.S. PATENT DOCUMENTS

| 7,721,803 B2 | 5/2010 | Huang et al. |
| 8,496,952 B2 | 7/2013 | Falk et al. |

(Continued)

FOREIGN PATENT DOCUMENTS

| WO | 2012125890 A2 | 9/2012 |
| WO | 2013033391 A1 | 3/2013 |
| WO | 2016048291 A1 | 3/2016 |

OTHER PUBLICATIONS

Poseidon Sciences: Non-leaching, ecofriendly biocidal technology for use in hydraulic fracturing fluids; available by Apr. 24, 2015.
(Continued)

*Primary Examiner* — Silvana C Runyan
(74) *Attorney, Agent, or Firm* — McDermott Will & Emery LLP

(57) ABSTRACT

It is often desirable to suppress the growth of bacteria when conducting oilfield operations, particularly in the subterranean environment. Methods for suppressing growth of bacteria can comprise: providing a plurality of biocidal proppant particulates, the biocidal proppant particulates comprising a biocidal coating upon proppant particulates, the biocidal coating comprising a plurality of biocidal nanoparticles dispersed within a binder material; introducing the biocidal proppant particulates into a wellbore penetrating a subterranean formation; localizing at least a portion of the biocidal proppant particulates within the subterranean formation; and suppressing growth of one or more types of bacteria with the biocidal nanoparticles in the wellbore or in the subterranean formation.

18 Claims, 2 Drawing Sheets

(58) Field of Classification Search
USPC ........................................................ 166/271
See application file for complete search history.

(56)  References Cited

U.S. PATENT DOCUMENTS

| | | |
|---|---|---|
| 2008/0119375 A1 | 5/2008 | Barmatov et al. |
| 2008/0227766 A1 | 9/2008 | Wunder et al. |
| 2009/0229827 A1 | 9/2009 | Bryant et al. |
| 2012/0190598 A1* | 7/2012 | McCubbins, Jr. ...... C09K 8/032 507/270 |
| 2013/0084339 A1 | 4/2013 | Cabal et al. |
| 2013/0196884 A1 | 8/2013 | Kakadjian et al. |
| 2014/0262247 A1* | 9/2014 | Duenckel ................. C09K 8/80 166/250.12 |
| 2014/0332214 A1* | 11/2014 | Zhou ..................... E21B 43/267 166/280.2 |
| 2014/0338906 A1* | 11/2014 | Monastiriotis ......... C09K 8/805 166/280.2 |

OTHER PUBLICATIONS

ISR/WO for PCT/US2014/057098 dated Jun. 12, 2015.

* cited by examiner

METHODS AND COMPOSITIONS FOR SUPPRESSING BACTERIAL GROWTH IN A SUBTERRANEAN ENVIRONMENT

BACKGROUND

The present disclosure generally relates to operations conducted within a wellbore, and, more specifically, to methods for suppressing bacterial growth in a subterranean environment.

Treatment fluids can be used in a variety of subterranean operations. Such subterranean operations can include, without limitation, drilling operations, stimulation operations, production operations, remediation operations, sand control treatments and the like. As used herein, the terms "treat," "treatment" and "treating" refer to any subterranean operation that uses a fluid in conjunction with achieving a desired function and/or for a desired purpose. Use of these terms does not imply any particular action by the treatment fluid or any component thereof, unless otherwise specified herein. Illustrative treatment operations can include, for example, fracturing operations, gravel packing operations, acidizing operations, scale dissolution and removal operations, consolidation operations, and the like.

A number of types of bacteria can be natively present in a subterranean formation, or they can be introduced into a subterranean formation in the course of drilling and completing a wellbore. The elevated temperatures of the subterranean environment can readily promote rapid bacterial growth. In addition, a number of treatment fluids contain materials that are ready food sources for some bacteria, which can further exacerbate bacterial growth issues.

Due to a number of undesirable consequences, it can often be desirable to suppress the propagation of bacteria within a subterranean environment and/or in a treatment fluid being introduced into a subterranean environment. Growth of bacterial colonies within a subterranean formation can produce sludge or slime within the formation and decrease the formation's porosity. Decreased porosity can lower production of a hydrocarbon resource from the formation. Sulfate-reducing bacteria can be particularly problematic within a subterranean environment, since they release hydrogen sulfide as a metabolic product. Hydrogen sulfide can result in corrosion of downhole metal goods, produce deleterious health effects, and lessen the quality of a produced hydrocarbon resource. When hydrogen sulfide or sulfur-containing organic compounds are present in a produced hydrocarbon resource, for example, costly refining techniques may be required in order to make the hydrocarbon resource suitable for its intended end use. Bacterial growth can also degrade certain components within a treatment fluid, such as viscosifying polymers, thereby changing the treatment fluid's properties and possibly making the treatment fluid unsuitable for its originally intended purpose.

Because of the serious consequences bacteria can produce in a subterranean environment, a number of techniques are used to suppress bacterial growth downhole. Continuous or pulsed ultraviolet light sources may be used for this purpose, but bacterial growth may resume if the bacteria are not all killed or inactivated by the light source. Similarly, chemical biocides may be used to suppress bacterial growth in a subterranean formation or in a treatment fluid. Although chemical biocides can be effective against various types of bacteria, it is often difficult to maintain the biocide in a desired location downhole. For example, chemical biocides can exit the subterranean environment during flowback of a treatment fluid, again allowing bacterial growth to resume if the bacteria are not all killed or inactivated. Chemical biocides can also be expensive and subject to decomposition in the harsh conditions of a subterranean environment. In addition, some chemical biocides can decompose the active components of a treatment fluid. For example, oxidative chemical biocides can decompose viscosifying polymers that are present in a fracturing fluid. There may also be environmental concerns associated with some chemical biocides.

Bacterial growth within the recesses of a subterranean formation can be particularly difficult to suppress. Specifically, it can be difficult to deliver a chemical biocide or an ultraviolet light treatment into inaccessible subterranean regions, such as the regions within and beyond propped fractures of a subterranean formation. In addition, conveying a chemical biocide through previously propped fractures can upset placement of the proppant, potentially undoing the effects of a fracturing operation and reducing the formation's permeability.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
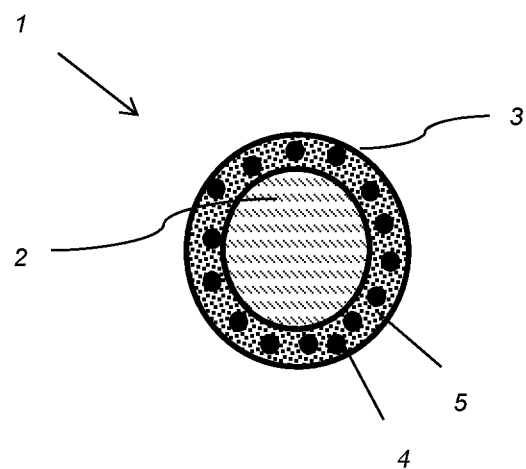
FIG. 1 shows an illustrative schematic of a biocidal proppant particulate.

The present disclosure generally relates to operations conducted within a wellbore, and, more specifically, to methods for suppressing bacterial growth in a subterranean environment.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

At present, there are a number of issues associated with mitigating the growth and propagation of bacteria in a subterranean environment and/or in a treatment fluid. Among the issues are cost, localization, stability and permanence.

The present inventors recognized that nanoparticles can be used during various subterranean operations in order to address a number of the shortcomings of current bacteria-mitigating treatments. Specifically, the present inventors recognized that by incorporating biocidal nanoparticles into an adhered biocidal coating within a subterranean formation, many advantages may be realized over conventional biocidal treatments. Some nanoparticles, particularly transition metal nanoparticles and their metal oxides, are known to have biocidal properties, although other types of nanoparticles may also have biocidal activity. The term "biocidal nanoparticles" will be used herein to describe nanoparticles having capability for suppressing the growth of one or more types of bacteria. The term "nanoparticles" will be used herein to refer to a particulate material having an equivalent spherical diameter of about 1000 nm or less in size, although suitable nanoparticles need not necessarily be spherical in shape. Particularly advantageous nanoparticles may have an equivalent spherical diameter of about 100 nm or less in size. Suitable nanoparticle shapes can include, for example, spheroids, toroids, platelets, rods, and the like.

On the whole, nanoparticles can present a number of advantages for suppressing bacterial growth in a subterranean environment. Some nanoparticles can be obtained or synthesized much more inexpensively than can conventional chemical biocides. Further, nanoparticles can possess significantly greater chemical stability within a subterranean environment than can some chemical biocides. Likewise, nanoparticles may display a decreased propensity to interact deleteriously with components of a treatment fluid used in subterranean operations. These properties can also be tailored during chemical synthesis of the nanoparticles.

An even greater advantage the present inventors recognized is that biocidal nanoparticles may be localized in a subterranean formation much more readily than can chemical biocides. Specifically, the inventors recognized that by disposing the biocidal nanoparticles in a binder material and forming a biocidal coating therefrom, the propensity of the nanoparticles to return from the subterranean formation in a flow back fluid can be greatly reduced through adhering the biocidal nanoparticles to a downhole surface. In the various embodiments of the present disclosure, the decreased flow back of the biocidal nanoparticles from the subterranean formation allows the biocidal effects to be much longer lasting compared to conventional biocidal treatment protocols. Further, there are several deployment configurations through which localization of biocidal nanoparticles can be realized within a subterranean formation, as discussed hereinafter.

One localized deployment configuration involves providing a biocidal coating upon proppant particulates, thereby forming biocidal proppant particulates. Upon setting the biocidal proppant particulates into propped fractures within a subterranean formation, the likelihood of freeing the proppant particulates and producing them from the subterranean formation decreases greatly. Because the biocidal nanoparticles are small in size relative to the size of the proppant particulates, they can form a very thin coating on the proppant particulates and not change their other properties to a significant degree, such as the proppant's mechanical strength. Localization of the biocidal proppant particulates within propped fractures can provide biocidal protection in the very regions that are difficult to treat with conventional biocidal treatments. Further, by making the proppant particulates themselves biocidal, a fracturing fluid used for conveying the proppant particulates into the subterranean formation can be made inherently biocidal without otherwise changing its composition or properties. Chemical biocides, in contrast, may interfere with or degrade certain components of fracturing fluids, such as viscosifying polymers.

As a further advantage of providing a biocidal coating on proppant particulates, there is considerable flexibility in how the coating may be applied. In some configurations, the biocidal coating can be previously applied or pre-coated onto the proppant particulates. In other configurations, the biocidal coating may be formed on the proppant particulates on-the-fly in conjunction with their introduction into a subterranean formation during a fracturing operation. On-the-fly coating can be particularly desirable, since it is not necessary to house a stockpile of pre-coated proppant, and the nature of the biocidal coating can be tailored as needed to address particular conditions downhole.

In another deployment configuration, the biocidal coating may be applied directly to a fracture face within a subterranean formation without being carried on proppant particulates. Specifically, the components of the biocidal coating can be carried in a pad fluid preceding the main fracturing fluid during a fracturing operation. The proppant-free pad fluid is introduced to the subterranean formation at or above a fracture gradient pressure of the subterranean formation, thereby resulting in the creation of one of more fractures at the fracture face. By adhering the biocidal coating upon the fracture face as the fractures form, such as through forming an adhesive bond, the likelihood of bacterial growth within inaccessible regions of the subterranean formation can be decreased. Further, by directly disposing the biocidal coating upon the fracture face during creation of the fractures, potential difficulties associated with properly placing the biocidal coating at a later time can be lessened.

After forming a biocidal coating upon the fracture face, a proppant-laden fracturing fluid can be used to dispose proppant particulates in the created fractures. Although the biocidal coating upon the fracture face may be sufficient by itself to suppress downhole bacterial growth, the degree of biocidal protection can be further increased, if needed, by utilizing biocidal proppant particulates, as discussed above. Disposing a biocidal coating upon both the proppant particulates and the fracture face allows different biocidal nanoparticles to be used in the biocidal coatings at each location, for example.

As an additional advantage, the biocidal coatings described herein can be further tailored, if needed, to adjust their degree of biocidal protection or their biocidal specificity. These factors may be impacted by, for example, the type and amount of biocidal nanoparticles used, the identity and degradability of the binder mater, the thickness of the biocidal coating, the presence of a surfactant coating on the biocidal nanoparticles, and the like. In addition, in either deployment configuration, the biocidal coating conveys enhanced wettability to the fracture face, which can help promote flowback of aqueous-based fluids from the subterranean formation.

Although localization of the biocidal nanoparticles is a desirable feature of the present disclosure, it can eventually be advantageous to release the biocidal nanoparticles from the biocidal coating in a controlled manner. For example, controlled release of the biocidal nanoparticles may eventually result in their conveyance to a subterranean region that was not initially experiencing bacterial growth. Controlled release of the biocidal nanoparticles may be accomplished by including a degradable material within the biocidal coating or by making the binder material itself degradable. Degradation of the biocidal coating may also promote release of the proppant particulates from the propped fractures at an intended time or increase the porosity of a proppant pack, for example. When only a component within the biocidal coating is degradable, but not the binder material itself, the coating's porosity may be desirably increased by forming voids or channels within the coating but without substantially releasing the biocidal nanoparticles therefrom. Thus, tailoring of the biocidal coating may desirably impact a number of its properties, including mechanical strength, compressibility, porosity, biocidal activity, biocidal specificity and the like.

In various embodiments, compositions of the present disclosure can comprise a plurality of biocidal nanoparticles dispersed within a binder material. Such compositions may be in the form of a coating, which may be used for localizing the biocidal nanoparticles within a subterranean formation, as discussed in further detail herein. In some embodiments, the coating may be disposed upon proppant particulates, thereby forming a composition comprising biocidal proppant particulates. In some embodiments, the components of the biocidal coating or the biocidal proppant particulates may be present in a carrier fluid, thereby forming a treatment fluid.

In more specific embodiments, compositions of the present disclosure can comprise biocidal proppant particulates. The biocidal proppant particulates comprise a biocidal coating upon proppant particulates. The biocidal coating comprises a plurality of biocidal nanoparticles dispersed within a binder material. The biocidal coating can be adhered to the proppant particulates.

FIG. 1 shows an illustrative schematic of a biocidal proppant particulate. As shown in FIG. 1, biocidal proppant particulate 1 includes proppant core 2 and biocidal coating 3 disposed thereon. Biocidal coating 3 includes biocidal nanoparticles 4 dispersed within binder material 5.

In some embodiments, compositions of the present disclosure may further comprise a carrier fluid. The carrier fluid may support the biocidal proppant particulates as they are conveyed into a subterranean formation. Suitable carrier fluids are not believed to be particularly limited, provided that the carrier fluid adequately fluidizes the biocidal proppant particulates. The carrier fluid may comprise an aqueous carrier fluid or an oil-based carrier fluid. Suitable aqueous carrier fluids may include, for example, fresh water, salt water, brine (saturated salt water), seawater, produced water (i.e., subterranean formation water brought to the surface), surface water (e.g., lake or river water), flow back water (i.e., water placed into a subterranean formation and then brought back to the surface), and the like.

Likewise, a carrier fluid may be used to convey a composition comprising biocidal nanoparticles and a binder material in which proppant particulates are not present. Again, suitable carrier fluids are not believed to be limited, provided that the carrier fluid adequately fluidizes the biocidal nanoparticles and the binder material. Suitable carrier fluids include those mentioned above.

In other embodiments, proppant-free compositions of the present disclosure may lack a separate carrier fluid. When a separate carrier fluid is not present, the binder material alone may provide sufficient fluidization to convey the biocidal nanoparticles in a subterranean treatment operation.

Proppant particulates suitable for inclusion in the compositions of the present disclosure are not believed to be particularly limited. Suitable proppant particulates include any material that can be satisfactorily coated with the biocidal coating under a particular set of conditions. Illustrative proppant particulates that may be used in conjunction with the embodiments described herein include, for example, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material in which suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, the like, and any combination thereof. The mean particulate size of the proppant particulates generally may range from about 2 mesh to about 400 mesh on the U.S. Sieve Series, although other sizes or mixtures of sizes may be desirable in certain embodiments. The proppant particulates may be substantially spherical materials, fibrous materials, polygonal materials (such as cubic materials), irregular shapes, and any combination thereof.

Biocidal nanoparticles that may be used in the various embodiments of the present disclosure include metal nanoparticles, metal oxide nanoparticles, metal halide nanoparticles, non-metal nanoparticles, and any combination thereof. Transition metal nanoparticles and their metal oxides and other salts may be particularly suitable. Specific biocidal nanoparticles that may be used in various embodiments of the present disclosure include, for example, silver nanoparticles, silver chloride nanoparticles, zinc nanoparticles, copper nanoparticles, iron nanoparticles, platinum nanoparticles, gold nanoparticles, titanium dioxide nanoparticles, selenium nanoparticles, germanium nanoparticles, lithium nanoparticles, alloys thereof and any combination thereof.

Although any size of biocidal nanoparticles may be used in the embodiments described herein, smaller nanoparticles may provide for more effective suppression of bacterial growth. In some embodiments, the biocidal nanoparticles can have a size of about 100 nm or under. In more particular embodiments, the biocidal nanoparticles can have a size of about 50 nm or under. In still more particular embodiments, the biocidal nanoparticles can have a size of about 25 nm or under, or a size of about 10 nm or under. In some embodiments, the biocidal nanoparticles may have a minimum size of about 1 nm.

The choice of a particular type or size of biocidal nanoparticles to be included in the present compositions may be dictated, at least to some degree, upon the type or species of bacteria whose growth is to be suppressed using the biocidal nanoparticles. The quantity of bacteria and their location in a subterranean formation may also at least partially dictate the choice of a particular biocidal nanoparticle for use in a given application. Such considerations lie within the purview of one having ordinary skill in the art and will not be discussed in further detail herein. It is therefore to be recognized that the biocidal nanoparticles or a combination of biocidal nanoparticles can be chosen at will when practicing the various embodiments of the present disclosure in order to address a particular downhole condition.

Similarly, the type, species, quantity and/or location of bacteria in a subterranean environment may also dictate, at least to some degree, the quantity of biocidal nanoparticles that are present in the compositions described herein. In some embodiments, the biocidal nanoparticles may comprise about 10% or less of the biocidal coating by weight, or about 5% or less of the biocidal coating by weight. When disposed on proppant particulates, the biocidal proppant particulates may comprise about 5% or less of the biocidal coating by weight, or about 1% or less of the biocidal coating by weight.

In some embodiments, the loading of the biocidal coating onto the proppant particulates may be chosen so that the biocidal nanoparticles maintain an exposed surface within the biocidal coating. That is, the biocidal coating thickness may be chosen to be less than or equal to the effective size of the biocidal nanoparticles. In other embodiments, thicker biocidal coatings may be used, wherein the coatings have a degree of porosity that is sufficient to convey an exposed surface to the biocidal nanoparticles dispersed within the binder material.

Suitable binder materials for inclusion in the compositions of the present disclosure may include any tackifying agent or resin composition, such as those commonly used in a subterranean environment. These materials are generally believed to be compatible with the biocidal nanoparticles. Suitable binder materials may include, but are not limited to, non-aqueous tackifying agents, aqueous tackifying agents, emulsified tackifying agents, silyl-modified polyamide compounds, resins, curable resins, silicon-based resins, crosslinkable polymer compositions, polymerizable monomer compositions, the like, and any combination thereof.

Suitable non-aqueous tackifying agents include polyamides that are by themselves nonhardening when introduced into the subterranean formation. One example of a non-aqueous tackifying agent that may be suitable for use in a biocidal coating is a condensation reaction product comprised of a polyacid and a polyamine. Commercial products include compounds such as combinations of dibasic acids containing some trimer and higher oligomers and also small amounts of monomer acids that are reacted with polyamines. Additional suitable non-aqueous tackifying agents include, for example, polyesters, polycarbonates, silyl-modified polyamide compounds, polycarbamates, urethanes, natural resins such as shellac, and the like. Combinations of these may be suitable as well.

Non-aqueous tackifying agents suitable for use in the embodiments of the present disclosure may either form a nonhardening coating on a surface or they may be combined with a multifunctional material capable of reacting with the non-aqueous tackifying agent to form a hardened coating. The hardened coating may exhibit a higher compressive strength than the tackifying agent alone. In this instance, the non-aqueous tackifying agent may function similarly to a resin material.

Multifunctional materials suitable for use in conjunction with a non-aqueous tackifying agent include, but are not limited to, aldehydes, dialdehydes, hemiacetals, acetals or other aldehyde-releasing compounds, aldehyde condensates, diacid halides, dihalides, polyacid anhydrides, epoxides, silyl-modified polyamide compounds, the like, and any combination thereof.

Aqueous tackifying agents suitable for use in the embodiments of the present disclosure are not initially tacky, but transform into a sticky, tackifying compound at a desired time. Such tackification may occur before, during, or after the aqueous tackifying agent is placed in a subterranean formation. Suitable aqueous tackifying agents are generally charged polymers comprising compounds that, when in an aqueous solvent or solution, will form a non-hardening coating by itself or with an activator.

Suitable aqueous tackifying agents include various polymers and pressure-sensitive adhesives. Examples of suitable aqueous tackifying agents include, but are not limited to, acrylic and methacrylic acid homopolymers and copolymers, acrylic and methacrylic acid ester homopolymers and copolymers, acrylamide methylpropane sulfonate homopolymers and copolymers, the like, any derivative thereof, any copolymer thereof, and any combination thereof.

Other aqueous tackifying agents may comprise at least one member selected from the group consisting of benzyl coco di-(hydroxyethyl) quaternary amine, p-T-amyl-phenol condensed with formaldehyde, and a copolymer comprising from about 80% to about 100% C1-30 alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophilic monomers may be any monomer that will provide polar oxygen-containing or nitrogen-containing groups. Suitable hydrophilic monomers include dialkyl amino alkyl (meth) acrylates and their quaternary addition and acid salts, acrylamide, N-(dialkyl amino alkyl) acrylamide, methacrylamides and their quaternary addition and acid salts, hydroxyalkyl (meth)acrylates, unsaturated carboxylic acids such as methacrylic acid or acrylic acid, hydroxyethyl acrylate, acrylamide, and the like. Combinations of these may be suitable as well.

In some embodiments, the binder material may comprise a curable resin. As used herein, the term "resin" will refer to any of numerous physically similar polymerized synthetics or chemically modified natural resins including thermoplastic materials and thermosetting materials. Resins that may be suitable for use in the embodiments of the present disclosure may include substantially all resins known and used in the art.

One type of resin suitable for use in the embodiments of the present disclosure is a two-component epoxy-based resin comprising a liquid hardenable resin component and a liquid hardening agent component. The liquid hardenable resin component comprises a hardenable resin and an optional solvent. The solvent may be added to the resin to reduce its viscosity for ease of handling, mixing and transferring. An alternate way to reduce the viscosity of the hardenable resin is to heat it. The second component is the liquid hardening agent component, which comprises a hardening agent, an optional silane coupling agent, a surfactant, an optional hydrolyzable ester, and an optional liquid carrier fluid.

Examples of hardenable resins that can be used in the liquid hardenable resin component include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, furan resins, urethane resins, glycidyl ether resins, other epoxide resins, the like and any combination thereof. In some embodiments, the hardenable resin may comprise a urethane resin.

The hardenable resin may be included in the liquid hardenable resin component in an amount ranging between about 5% to about 100% by weight of the liquid hardenable resin component. It is within the ability of one having ordinary skill in the art and the benefit of this disclosure to determine how much of the liquid hardenable resin component may be needed to achieve desired results. Factors that may affect this decision include which type of liquid hardenable resin component and liquid hardening agent component are used.

Any solvent that is compatible with the hardenable resin and achieves the desired viscosity effect may be suitable for use in the liquid hardenable resin component. Suitable solvents may include, for example, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, D-limonene, fatty acid methyl esters, butylglycidyl ether, and any combination thereof. Other suitable solvents may include aqueous miscible solvents such as methanol, isopropanol, butanol, and glycol ether solvents, and combinations thereof. Suitable glycol ether solvents include, but are not limited to, diethylene glycol methyl ether, dipropylene glycol methyl ether, 2-butoxy ethanol, ethers of a C2 to C6 dihydric alkanol containing at least one C1 to C6 alkyl group, mono ethers of dihydric alkanols, methoxypropanol, butoxyethanol, and hexoxyethanol, and isomers thereof. Selection of an appropriate solvent may be dependent on the resin composition chosen, which is within the ability of one having ordinary skill in the art and the benefit of this disclosure.

Use of a solvent in the liquid hardenable resin component is optional but may be desirable to reduce the viscosity of the hardenable resin component for ease of handling, mixing, and transferring. It is within the ability of one having ordinary skill in the art and the benefit of this disclosure to determine if and how much solvent is needed to achieve a suitable viscosity. In some embodiments, the amount of the solvent used in the liquid hardenable resin component may be in the range of about 0.1% to about 30% by weight of the liquid hardenable resin component. Optionally, the liquid hardenable resin component may be heated to reduce its viscosity, in place of, or in addition to, using a solvent.

Examples of hardening agents that can be used in the liquid hardening agent component include, but are not limited to, cyclo-aliphatic amines, such as piperazine, derivatives of piperazine (e.g., aminoethylpiperazine) and modified piperazines; aromatic amines, such as methylene dianiline, derivatives of methylene dianiline and hydrogenated forms, and 4,4'-diaminodiphenyl sulfone; aliphatic amines, such as ethylene diamine, diethylene triamine, triethylene tetraamine, and tetraethylene pentaamine; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; and 2-ethyl-4-methyl imidazole; and combinations thereof. The chosen hardening agent often effects the range of temperatures over which a hardenable resin is able to cure. By way of example, and not limitation, in subterranean formations having a temperature of about 60° F. to about 250° F., amines and cyclo-aliphatic amines such as piperidine, triethylamine, tris(dimethylaminomethyl) phenol, and dimethylaminomethyl)phenol may be preferred. In subterranean formations having higher temperatures, 4,4'-diaminodiphenyl sulfone may be a suitable hardening agent.

A hardening agent may be included in the liquid hardening agent component in an amount sufficient to at least partially harden the resin composition. In some embodiments, the hardening agent used is included in the liquid hardening agent component in the range of about 0.1% to about 95% by weight of the liquid hardening agent component. In other embodiments, the hardening agent used may be included in the liquid hardening agent component in an amount of about 15% to about 85% by weight of the liquid hardening agent component. In other embodiments, the hardening agent used may be included in the liquid hardening agent component in an amount of about 15% to about 55% by weight of the liquid hardening agent component.

In some embodiments, the binder material may comprise a liquid hardenable resin component emulsified in a liquid hardening agent component, wherein the liquid hardenable resin component is the internal phase of the emulsion and the liquid hardening agent component is the external phase of the emulsion. In other embodiments, the liquid hardenable resin component may be emulsified in water and the liquid hardening agent component may be present in the water. In other embodiments, the liquid hardenable resin component may be emulsified in water and the liquid hardening agent component may be provided separately. Similarly, in other embodiments, the liquid hardenable resin component and the liquid hardening agent component may both be emulsified in water.

The optional silane coupling agent may be used, among other things, to act as a mediator to help bond the resin to a surface. Examples of suitable silane coupling agents include, but are not limited to, N-2-(aminoethyl)-3-aminopropyltrimethoxysilane, 3-glycidoxypropyltrimethoxysilane, and any combination thereof. The silane coupling agent may be included in the resin component or the liquid hardening agent component. In some embodiments, the silane coupling agent used may be included in the liquid hardening agent component in a range of about 0.1% to about 3% by weight of the liquid hardening agent component.

Any surfactant compatible with the hardening agent and capable of facilitating the coating of the resin may be used in the liquid hardening agent component. Suitable surfactants include, but are not limited to, alkyl phosphonate surfactants (e.g., C12-C22 alkyl phosphonate surfactants), an ethoxylated nonyl phenol phosphate ester, one or more cationic surfactants, and one or more nonionic surfactants. Combinations of one or more cationic and nonionic surfactants also may be suitable. The surfactant or surfactants may be included in the liquid hardening agent component in an amount ranging between about 1% to about 10% by weight of the liquid hardening agent component.

Examples of hydrolyzable esters that may be used in the liquid hardening agent component include, but are not limited to, a combination of dimethylglutarate, dimethyladipate, and dimethylsuccinate; dimethylthiolate; methyl salicylate; dimethyl salicylate; dimethylsuccinate; and any combination thereof. When used, a hydrolyzable ester may be included in the liquid hardening agent component in an amount ranging between about 0.1% to about 3% by weight of the liquid hardening agent component. In some embodiments, a hydrolyzable ester may be included in the liquid hardening agent component in an amount ranging between about 1% to about 2.5% by weight of the liquid hardening agent component.

Use of a diluent or liquid carrier fluid in the liquid hardening agent component is optional and may be used to reduce the viscosity of the liquid hardening agent component for ease of handling, mixing, and transferring. Any suitable carrier fluid that is compatible with the liquid hardening agent component and achieves the desired viscosity effect may be suitable for use in the embodiments of the present disclosure. Some suitable liquid carrier fluids include solvents as, for example, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, D-limonene, fatty acid methyl esters, and any combination thereof. Other suitable liquid carrier fluids include aqueous miscible solvents such as, for example, methanol, isopropanol, butanol, glycol ether solvents, and any combination thereof. Suitable glycol ether liquid carrier fluids include, but are not limited to, diethylene glycol methyl ether, dipropylene glycol methyl ether, 2-butoxy ethanol, ethers of a C2-C6 dihydric alkanol having at least one C1-C6 alkyl group, mono ethers of dihydric alkanols, methoxypropanol, butoxyethanol, and hexoxyethanol, and isomers thereof. Combinations of these may be suitable as well. Selection of an appropriate liquid carrier fluid may be dependent upon the chosen resin composition, for example.

Other resins suitable for use in the embodiments of the present disclosure are furan-based resins. Suitable furan-based resins include, but are not limited to, furfuryl alcohol resins, furfural resins, combinations of furfuryl alcohol resins and aldehydes, and a combination of furan resins and phenolic resins. A furan-based resin may be combined with a solvent to control viscosity, if desired. Suitable solvents for use with a furan-based resin include, but are not limited to, 2-butoxy ethanol, butyl lactate, butyl acetate, tetrahydrofurfuryl methacrylate, tetrahydrofurfuryl acrylate, esters of oxalic, maleic and succinic acids, and furfuryl acetate. In some embodiments, the furan-based resins may be capable of enduring temperatures well in excess of 350° F. without degrading. In some embodiments, the furan-based resins suitable for use in the embodiments of the present disclosure are capable of enduring temperatures up to about 700° F. without degrading.

Optionally, the furan-based resins may further comprise a curing agent to facilitate or accelerate curing of the furan-based resin at lower temperatures. Examples of suitable curing agents may include organic or inorganic acids, such as, for example, maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid, and any combination thereof. In embodiments where a curing agent is not used, the furan-based resin may cure autocatalytically.

Still other resins suitable for use in the embodiments of the present disclosure are phenolic-based resins. Suitable phenolic-based resins include, but are not limited to, terpolymers of phenol, phenolic formaldehyde resins, and a combination of phenolic and furan resins. A phenolic-based resin may be combined with a solvent to control viscosity, if desired. Suitable solvents include, but are not limited to, butyl acetate, butyl lactate, furfuryl acetate, and 2-butoxy ethanol.

Yet another resin material suitable for use in the embodiments of the present disclosure is a phenol/phenol formaldehyde/furfuryl alcohol resin comprising about 5% to about 30% phenol, about 40% to about 70% phenol formaldehyde, about 10% to about 40% furfuryl alcohol, about 0.1% to about 3% of a silane coupling agent, and about 1% to about 15% of a surfactant. Suitable silane coupling agents include, but are not limited to, N-2-(aminoethyl)-3-aminopropyltrimethoxysilane, 3-glycidoxypropyltrimethoxysilane, and any combination thereof. Suitable surfactants include, but are not limited to, an ethoxylated nonyl phenol phosphate ester, combinations of one or more cationic surfactants, and one or more nonionic surfactants and an alkyl phosphonate surfactant.

In some embodiments, filler materials may be present in the compositions of the present disclosure. Suitable filler materials may include any particle that does not adversely react with the other components present in the composition or a biocidal coating formed therefrom. Examples of suitable filler materials include silica, glass, clay, alumina, fumed silica, carbon black, graphite, mica, meta-silicate, calcium silicate, calcinite, kaolinite, talc, zirconia, titanium dioxide, fly ash, boron, and any combination thereof. In some embodiments, the filler material may range in size from about 0.01 µm to about 100 µm. The filler material may be included in the composition in an amount ranging between about 0.1% to about 70% by weight, or between about 0.5% to about 40% by weight, or between about 1% to about 10% by weight. Suitable filler materials may be of any suitable shape, such as particulate or fibrous.

In some embodiments, the compositions described herein may be degradable, or a component of the compositions may be degradable. In some embodiments, the binder material of the compositions may be degradable. In other embodiments, a degradable material may be present within a binder material that is otherwise substantially non-degradable. Suitable degradable materials may be in particulate or fibrous in shape in some embodiments.

Degradability of a biocidal coating formed from the compositions can serve a number of purposes within the context of the present disclosure. For example, a degradable binder material may result in controlled release of the biocidal nanoparticles into the downhole environment. Degradable binder materials may also promote production of proppant particulates at a later stage of production. A degradable material within the binder material may provide better access to the biocidal nanoparticles by promoting the formation of channels or porosity within the biocidal coating. The formation of channels or porosity within the biocidal coating can increase the exposed surface area of the biocidal nanoparticles, thereby improving their ability to suppress bacterial growth.

Suitable degradable materials that may be present in a substantially non-degradable binder material include, for example, water-degradable materials, oil-degradable materials, thermally degradable materials, oxidatively degradable materials, hydrolytically degradable materials (acid- or base-degradable), or any combination thereof.

In some embodiments, the degradable material may be a degradable polymer. The degradability of a polymer depends at least in part on its backbone structure. For instance, the presence of hydrolyzable and/or oxidizable linkages in the polymer backbone may yield a degradable material. The degradation rate may depend upon factors such as, for example, the type of repeat unit, composition, sequence, length, molecular geometry, molecular weight, morphology (e.g., crystallinity, size of spherulites, and orientation), hydrophilicity, hydrophobicity, surface area, and additives. Also, the environment to which the polymer is exposed may affect the degradation rate (e.g., temperature, presence of moisture, oxygen, microorganisms, enzymes, pH, and the like).

Oil-degradable polymers that may be used in the compositions of the present disclosure may be either natural or synthetic polymers. Illustrative oil-degradable polymers include, but are not limited to, polyacrylics, polyamides, and polyolefins such as polyethylene, polypropylene, polyisobutylene, and polystyrene.

Other examples of suitable degradable polymers that may be used in accordance with the embodiments of the present disclosure include polysaccharides such as dextran or cellulose; chitins; chitosans; proteins; aliphatic polyesters; poly (lactides); poly(glycolides); poly(s-caprolactones); poly(hydroxybutyrates); poly(anhydrides); aliphatic or aromatic polycarbonates; poly(orthoesters); poly(amino acids); poly (ethylene oxides); and polyphosphazenes. In some or other embodiments, suitable degradable polymers may be selected from substituted or unsubstituted polylactides, polyglycolides, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and any combination thereof.

In some embodiments, dehydrated salts may be used in the compositions as a degradable material. A dehydrated salt degrades over time as it slowly hydrates. Anhydrous borate materials may constitute a suitable degradable material in some embodiments. Specific examples of anhydrous borate materials that may be used include, but are not limited to, anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid.

In addition to degradable materials, other substances can also be present within the compositions and biocidal coatings formed therefrom. In some embodiments, particulate filler materials or fibrous filler materials may be present, such as those discussed above. These materials are not believed to be particularly limited.

Organic biocides may also be present in some embodiments of the present compositions. As used herein, the term "organic biocide" will refer to a biocidal compound formed from a carbon-containing organic compound. Suitable organic biocides that may be present in the compositions of the present disclosure include, for example, aldehydes (such as formaldehyde and glutaraldehyde), quaternary amines, isothizaolines, carbamates, phosphonium quaternary compounds, triazine compounds, and halogenated compounds (such as dibromonitrilopropionamide and bromonitropropanediol). Examples of suitable organic biocides may include those commercially available from Halliburton Energy Services Inc. under the trade names "Aldacide™ G," BE3™, BE6™, "BE-7™" and "BE-9™."

In addition to the foregoing, various other components that are used in subterranean operations may be included in the compositions described herein. Such additional components may include, without limitation, salts, pH control additives, foaming agents, antifoaming agents, breakers, biocides, crosslinkers, additional fluid loss control agents, stabilizers, chelating agents, scale inhibitors, gases, mutual solvents, particulates, corrosion inhibitors, oxidizing agents, reducing agents, antioxidants, relative permeability modifiers, viscosifying agents, proppant particulates, gravel particulates, scale inhibitors, emulsifying agents, de-emulsifying agents, iron control agents, clay control agents, flocculants, scavengers, lubricants, friction reducers, viscosifiers, weighting agents, hydrate inhibitors, consolidating agents, any combination thereof, and the like.

As alluded to above, the compositions of the present disclosure may be used in various manners for suppressing the growth of bacteria and/or inhibiting their viability in a subterranean formation. In various embodiments, the biocidal compositions of the present disclosure may be directly disposed on a fracture face of the subterranean formation by forming an adhesive connection, or they may be disposed on proppant particulates introduced to a subterranean formation.

In some embodiments, use of the compositions in suppressing bacterial growth may involve killing at least a portion of the bacteria outright. In some or other embodiments, use of the compositions in suppressing bacterial growth may involve rendering the bacteria non-viable without killing the bacteria outright. As used herein, the term "non-viable" and various grammatical forms thereof will refer to bacteria that have been rendered unable to reproduce as a result of a biocidal treatment.

In some embodiments, methods described herein may comprise: providing a plurality of biocidal proppant particulates, the biocidal proppant particulates comprising a biocidal coating upon proppant particulates, the biocidal coating comprising a plurality of biocidal nanoparticles dispersed within a binder material; introducing the biocidal proppant particulates into a wellbore penetrating a subterranean formation; localizing at least a portion of the biocidal proppant particulates within the subterranean formation; and suppressing growth of one or more types of bacteria with the biocidal nanoparticles in the wellbore or in the subterranean formation.

In some embodiments, the biocidal proppant particulates are present in a fracturing fluid when introduced into the wellbore. The fracturing fluid may comprise a carrier fluid and a viscosifying polymer. One of ordinary skill in the art will recognize a number of viscosifying polymers that may be suitable for conveying enhanced viscosity to a fracturing fluid. One of ordinary skill in the art will further recognize that many of these viscosifying polymers constitute a ready food source for various bacteria, which can make suppression of bacterial growth in a fracturing fluid desirable, either before or after its introduction into a subterranean formation. Suitable viscosifying polymers may include natural polymers, derivatives of natural polymers, synthetic polymers, biopolymers, the like, and any combination thereof. Suitable viscosifying polymers may include guar, xanthan, diutan, scleroglucan, high-molecular weight polysaccharides, the like, any derivative thereof, and any combination thereof. Particularly suitable viscosifying polymers may include hydropropyl guar (HPG), carboxymethyl guar (CMG), and carboxymethylhydroxypropyl guar (CMHPG). Cellulose derivatives such as hydroxyethylcellulose (HEC), hydroxypropylcellulose (HPC), carboxymethylcellulose (CMC), or carboxymethylhydroxyethylcellulose (CMHEC) may also be suitable viscosifying polymers. Synthetic polymers such as, for example, polyacrylamide and polyacrylate polymers, polyvinyl alcohol, polyethylene glycol, polypropylene glycol, the like, and copolymers thereof may also be suitable viscosifying polymers for use in a fracturing fluid.

In some embodiments, the biocidal proppant particulates may be localized in one or more fractures present within the subterranean formation. The one or more fractures may be existing fractures in some embodiments, or they may be newly produced fractures created by a fracturing fluid containing the biocidal proppant particulates in other embodiments. In some embodiments, the fractures may be created by a pad fluid preceding a fracturing fluid containing the biocidal proppant particulates. In alternative embodiments, the biocidal proppant particulates may be left within the wellbore, such as when forming a gravel pack within the wellbore. When forming a gravel pack within the wellbore, the biocidal nanoparticles may still function similarly in suppressing bacterial growth within the subterranean formation.

In other various embodiments, the biocidal coating may be formed onto a surface in the subterranean formation during a treatment operation. More specifically, in some embodiments, the biocidal coating may be formed onto a fracture face in a subterranean formation during a fracturing operation. The fracture face contains generated fractures. Formation of a biocidal coating onto the fracture face may take place without disposing the biocidal coating on proppant particulates.

In some embodiments, methods described herein may comprise: introducing a pad fluid comprising a binder material and a plurality of biocidal nanoparticles into a wellbore penetrating a subterranean formation; generating one or more fractures within the subterranean formation in the presence of the pad fluid, the one or more fractures comprising at least a portion of a fracture face; disposing a biocidal coating onto the fracture face, the biocidal coating comprising the biocidal nanoparticles dispersed within the binder material, and the biocidal coating being localized at the fracture face; and suppressing growth of one or more types of bacteria with the biocidal nanoparticles in the wellbore or in the subterranean formation. As used herein, the term "pad fluid" will refer to a small quantity of proppant-free treatment fluid that is introduced to a subterranean formation in advance of a proppant-loaded fracturing fluid during a fracturing operation. Other than lacking proppant particulates, the pad fluid can have the same composition or a different composition than the main fracturing fluid.

In some embodiments, the methods can further comprise introducing a fracturing fluid to the subterranean formation following the pad fluid. During a fracturing operation, the pad fluid and the fracturing fluid are introduced into the wellbore at or above the fracture gradient pressure of the subterranean formation. The pad fluid and the fracturing fluid can create or enhance or more fractures in the subterranean formation. Proppant particulates from the fracturing fluid may then be disposed in the one or more fractures.

When treating a fracture face and forming a biocidal coating thereon, the concentration of biocidal nanoparticles in the pad fluid may be chosen to suppress the growth of bacteria to a desired degree. In various embodiments, the pad fluid may comprise about 10% or less of the biocidal nanoparticles by weight relative to the weight of the pad fluid. In more specific embodiments, the pad fluid may comprise about 5% or less of the biocidal nanoparticles by weight, or about 1% or less of the biocidal nanoparticles by weight. In some embodiments, a minimum concentration of biocidal nanoparticles in the pad fluid may be about 0.1% by weight. In still other embodiments, a minimum concentration of biocidal nanoparticles in the pad fluid may be as low as about 0.01% by weight.

In addition to forming a biocidal coating on a fracture face within the subterranean formation, the methods described herein may further comprise introducing a plurality of proppant particulates into the one or more fractures of the fracture face. That is, the methods of the present disclosure may further comprise introducing a fracturing fluid comprising proppant particulates into the wellbore at or above a fracture gradient pressure of the subterranean formation following the pad fluid.

In more specific embodiments, the proppant particulates introduced to the wellbore following the pad fluid may comprise biocidal proppant particulates, such as those described hereinabove. More particularly, the biocidal proppant particulates may comprise a biocidal coating upon the proppant particulates, where the biocidal coating on the proppant particulates comprises a second plurality of biocidal nanoparticles within a second binder material. That is, the methods of the present disclosure may be used to directly deposit biocidal nanoparticles both upon a fracture face as fractures are being generated and within the generated fractures by depositing biocidal proppant particulates therein. When biocidal proppant particulates are used in conjunction with a biocidal coating on the fracture face, the biocidal nanoparticles within the biocidal proppant particulates may comprise biocidal nanoparticles that are the same or different than those in the biocidal coating upon the fracture face.

The type of bacteria whose growth is to be suppressed using the embodiments of the present disclosure is not believed to be particularly limited. Upon the identification of a particular strain or type of bacteria in the wellbore or the subterranean formation, biocidal nanoparticles can be chosen that particularly target the type(s) of bacteria that are present. In more specific embodiments, the bacteria present in the wellbore or the subterranean formation can be anaerobic bacteria, particularly sulfate-reducing bacteria. Particular bacteria of interest in the oilfield industry whose growth may be suppressed using the methods described herein include, for example, *Desulfovibrio desulfuricans*, *Desulfovibrio vulgaris*, *Desulfosarcina variabilis*, *Desulfobacter hydrogenophilus*, *Bdellovibrio bacteriovorus*, *Myxococcus xanthus*, *Bacillus subtilis*, and *Methanococcus vannielii*.

In other various embodiments, systems configured for delivering the compositions described herein to a downhole location are described. In various embodiments, the systems can comprise a pump fluidly coupled to a tubular, the tubular containing a composition comprising a carrier fluid, a binder material, and a plurality of biocidal nanoparticles. In more particular embodiments, the composition can further comprise a plurality of proppant particulates upon which the binder material and the biocidal nanoparticles form a biocidal coating. Accordingly, in some embodiments, systems of the present disclosure may comprise a pump fluidly coupled to a tubular, the tubular containing a composition comprising a carrier fluid and a plurality of biocidal proppant particulates within the carrier fluid. The biocidal proppant particulates comprise a biocidal coating upon proppant particulates. The biocidal coating comprises a plurality of biocidal nanoparticles dispersed within a binder material.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce a composition to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the composition to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the composition is formulated. In various embodiments, the pump (e.g., a low pressure pump, a high pressure pump, or a combination thereof) may convey the composition from the mixing tank or other source of the treatment fluid to the tubular. In other embodiments, however, the composition can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 2:
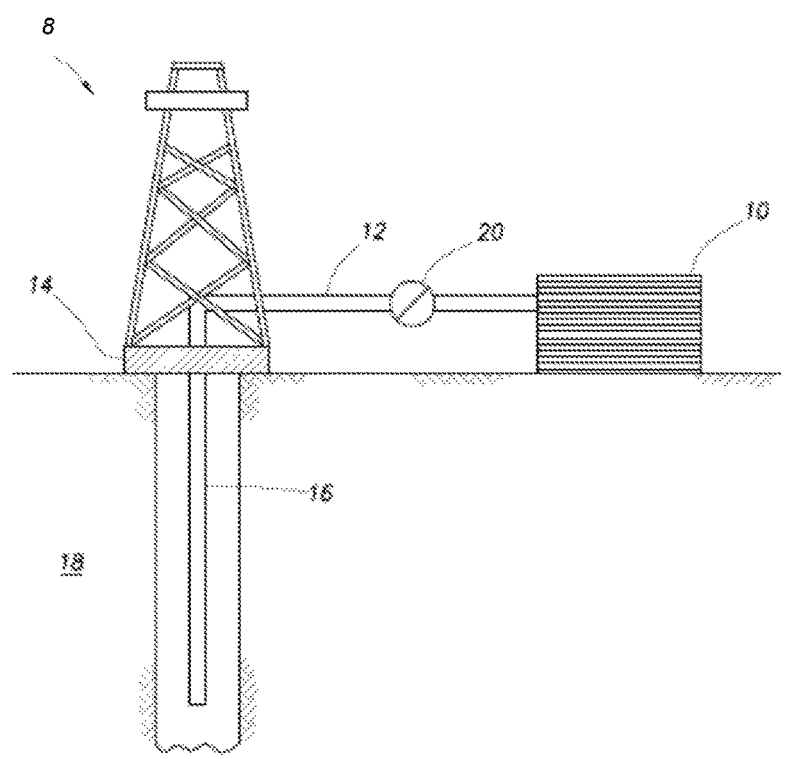
FIG. 2 shows an illustrative schematic of a system that can deliver compositions of the present disclosure to a downhole location, according to one or more embodiments.

FIG. 2 shows an illustrative schematic of a system that can deliver compositions of the present disclosure to a downhole location, according to one or more embodiments. It should be noted that while FIG. 2 generally depicts a land-based system, it is to be recognized that like systems may be operated in subsea locations as well. As depicted in FIG. 2, system 8 may include mixing tank 10, in which a composition of the present disclosure may be formulated. The composition may be conveyed via line 12 to wellhead 14, where the composition enters tubular 16, tubular 16 extending from wellhead 14 into subterranean formation 18. Tubular 16 may include orifices that allow the fluid to enter into the subterranean formation. Upon being ejected from tubular 16, the composition may subsequently penetrate into subterranean formation 18. Pump 20 may be configured to raise the pressure of the composition to a desired degree before its introduction into tubular 16. It is to be recognized that system 8 is merely exemplary in nature and various additional components may be present that have not necessarily been depicted in FIG. 2 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

Although not depicted in FIG. 2, the composition may, in some embodiments, flow back to wellhead 14 and exit subterranean formation 18. In some embodiments, the composition that has flowed back to wellhead 14 may subsequently be recovered and recirculated to subterranean formation 18. In other embodiments, the composition may flow back to wellhead 14 in a produced hydrocarbon fluid from the subterranean formation.

It is also to be recognized that the disclosed compositions may also directly or indirectly affect the various downhole equipment and tools that may come into contact with the compositions during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

Embodiments disclosed herein include:

A. Methods for suppressing bacterial growth in a subterranean formation. The methods comprise: introducing the biocidal proppant particulates into a wellbore penetrating a subterranean formation, the biocidal proppant particulates comprising a biocidal coating upon proppant particulates, the biocidal coating comprising a plurality of biocidal nanoparticles dispersed within a binder material; localizing at least a portion of the biocidal proppant particulates within the subterranean formation; and suppressing growth of one or more types of bacteria with the biocidal nanoparticles in the wellbore or in the subterranean formation.

B. Methods for suppressing bacterial growth in a subterranean formation. The methods comprise: introducing a pad fluid comprising a binder material and a plurality of biocidal nanoparticles into a wellbore penetrating a subterranean formation; generating one or more fractures within the subterranean formation in the presence of the pad fluid, the one or more fractures comprising at least a portion of a fracture face; disposing a biocidal coating onto the fracture face, the biocidal coating comprising the biocidal nanoparticles dispersed within the binder material, and the biocidal coating being localized at the fracture face; and suppressing growth of one or more types of bacteria with the biocidal nanoparticles in the wellbore or in the subterranean formation.

C. Biocidal compositions: The compositions comprise: a plurality of biocidal proppant particulates comprising a biocidal coating upon proppant particulates, the biocidal coating comprising a plurality of biocidal nanoparticles dispersed within a binder material.

D. Systems for delivering a biocidal composition to a subterranean formation. The systems comprise: a pump fluidly coupled to a tubular, the tubular containing a composition comprising a carrier fluid and a plurality of biocidal proppant particulates within the carrier fluid, the biocidal proppant particulates comprising a biocidal coating upon proppant particulates, the biocidal coating comprising a plurality of biocidal nanoparticles dispersed within a binder material.

Each of embodiments A-D may have one or more of the following additional elements in any combination:

Element 1: wherein the biocidal proppant particulates are present in a fracturing fluid when introduced into the wellbore, the fracturing fluid comprising a carrier fluid and a viscosifying polymer.

Element 2: wherein the biocidal proppant particulates are localized in one or more fractures present within the subterranean formation.

Element 3: wherein the biocidal proppant particulates comprise about 1% or less of the biocidal coating by weight.

Element 4: wherein the biocidal nanoparticles comprise at least one type of nanoparticle selected from the group consisting of silver nanoparticles, silver chloride nanoparticles, zinc nanoparticles, copper nanoparticles, iron nanoparticles, platinum nanoparticles, gold nanoparticles, titanium dioxide nanoparticles, selenium nanoparticles, germanium nanoparticles, lithium nanoparticles, and any combination thereof.

Element 5: wherein the binder material comprises a tackifying agent or a curable resin.

Element 6: wherein providing the plurality of biocidal proppant particulates comprises disposing the biocidal coating onto the proppant particulates on-the-fly.

Element 7: wherein the biocidal coating further comprises a degradable material, a particulate filler material, a fibrous filler material, an organic biocide, or any combination thereof.

Element 8: wherein the pad fluid is introduced into the wellbore at or above a fracture gradient pressure of the subterranean formation.

Element 9: wherein the pad fluid comprises about 1% or less of the biocidal nanoparticles by weight.

Element 10: wherein the method further comprises introducing a plurality of proppant particulates into the one or more fractures.

Element 11: wherein the proppant particulates comprise biocidal proppant particulates, the biocidal proppant particulates comprising a second biocidal coating upon proppant particulates, the second biocidal coating comprising a second plurality of biocidal nanoparticles dispersed within a second binder material.

Element 12: wherein the composition further comprises a carrier fluid in which the biocidal proppant particulates are disposed.

By way of non-limiting example, exemplary combinations applicable to A-D include:

The method of A in combination with elements 1 and 4.
The method of A in combination with elements 3 and 4.
The method of A in combination with elements 5 and 6.
The method of A in combination with elements 4 and 7.
The method of B in combination with elements 4 and 8.
The method of B in combination with elements 8 and 10.
The method of B in combination with elements 10 and 11.
The method of B in combination with elements 4 and 7.
The composition of C or the system of D in combination with elements 3 and 12.
The composition of C or the system of D in combination with elements 4 and 5.
The composition of C or the system of D in combination with elements 4 and 7.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
introducing biocidal proppant particulates into a wellbore penetrating a subterranean formation, the biocidal proppant particulates comprising a biocidal coating upon proppant particulates, the biocidal coating comprising a plurality of biocidal nanoparticles dispersed within a binder material;
localizing at least a portion of the biocidal proppant particulates within the subterranean formation; and
suppressing growth of one or more types of bacteria with the biocidal nanoparticles in the wellbore or in the subterranean formation,
wherein the biocidal coating further comprises a degradable material,
wherein the binder material is substantially non-degradable, and
wherein the degradable material promotes formation of channels or porosity within the biocidal coating to increase an exposed surface area of the biocidal nanoparticles without substantially releasing the biocidal nanoparticles therefrom.

2. The method of claim 1, wherein the biocidal proppant particulates are present in a fracturing fluid when introduced into the wellbore, the fracturing fluid comprising a carrier fluid and a viscosifying polymer.

3. The method of claim 2, wherein the biocidal proppant particulates are localized in one or more fractures present within the subterranean formation.

4. The method of claim 1, wherein the biocidal proppant particulates comprise about 1% or less of the biocidal coating by weight.

5. The method of claim 1, wherein the biocidal nanoparticles comprise at least one type of nanoparticle selected from the group consisting of silver nanoparticles, silver chloride nanoparticles, zinc nanoparticles, copper nanoparticles, iron nanoparticles, platinum nanoparticles, gold nanoparticles, titanium dioxide nanoparticles, selenium nanoparticles, germanium nanoparticles, lithium nanoparticles, and any combination thereof.

6. The method of claim 1, wherein the binder material comprises a tackifying agent or a curable resin.

7. The method of claim 1, wherein providing the plurality of biocidal proppant particulates comprises disposing the biocidal coating onto the proppant particulates on-the-fly.

8. A method comprising:
introducing a pad fluid comprising a binder material and a plurality of biocidal nanoparticles into a wellbore penetrating a subterranean formation;
generating one or more fractures within the subterranean formation in the presence of the pad fluid, the one or more fractures comprising at least a portion of a fracture face;

disposing a biocidal coating onto the fracture face, the biocidal coating comprising the biocidal nanoparticles dispersed within the binder material, and the biocidal coating being localized at the fracture face; and suppressing growth of one or more types of bacteria with the biocidal nanoparticles in the wellbore or in the subterranean formation, wherein the biocidal coating further comprises a degradable material, wherein the binder material is substantially non-degradable, and wherein the degradable material promotes formation of channels or porosity within the biocidal coating to increase an exposed surface area of the biocidal nanoparticles without substantially releasing the biocidal nanoparticles therefrom.

9. The method of claim 8, wherein the pad fluid is introduced into the wellbore at or above a fracture gradient pressure of the subterranean formation.

10. The method of claim 8, wherein the pad fluid comprises about 1% or less of the biocidal nanoparticles by weight.

11. The method of claim 8, wherein the biocidal nanoparticles comprise at least one type of nanoparticle selected from the group consisting of silver nanoparticles, silver chloride nanoparticles, zinc nanoparticles, copper nanoparticles, iron nanoparticles, platinum nanoparticles, gold nanoparticles, titanium dioxide nanoparticles, selenium nanoparticles, germanium nanoparticles, lithium nanoparticles, and any combination thereof.

12. The method of claim 8, wherein the binder material comprises a tackifying agent or a curable resin.

13. The method of claim 8, further comprising:
introducing a plurality of proppant particulates into the one or more fractures.

14. The method of claim 13, wherein the proppant particulates comprise biocidal proppant particulates, the biocidal proppant particulates comprising a second biocidal coating upon proppant particulates, the second biocidal coating comprising a second plurality of biocidal nanoparticles dispersed within a second binder material.

15. A method comprising:
introducing biocidal proppant particulates into a wellbore penetrating a subterranean formation, the biocidal proppant particulates comprising a biocidal coating upon proppant particulates, the biocidal coating comprising a plurality of biocidal nanoparticles dispersed within a binder material, wherein the biocidal coating further comprises a degradable material, wherein the binder material is substantially non-degradable, and wherein the degradable material promotes formation of channels or porosity within the biocidal coating to increase an exposed surface area of the biocidal nanoparticles without substantially releasing the biocidal nanoparticles therefrom.

16. The method of claim 15, wherein the biocidal proppant particulates are disposed in a carrier fluid.

17. The method of claim 15, wherein the biocidal nanoparticles comprise at least one type of nanoparticle selected from the group consisting of silver nanoparticles, silver chloride nanoparticles, zinc nanoparticles, copper nanoparticles, iron nanoparticles, platinum nanoparticles, gold nanoparticles, titanium dioxide nanoparticles, selenium nanoparticles, germanium nanoparticles, lithium nanoparticles, and any combination thereof.

18. The method of claim 15, wherein the binder material comprises a tackifying agent or a curable resin.

* * * * *